June 10, 1924.
J. A. TOPPING
SHINGLE CLAMP
Filed July 29, 1922
1,496,912
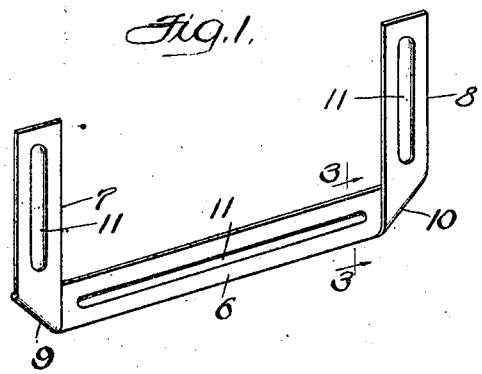
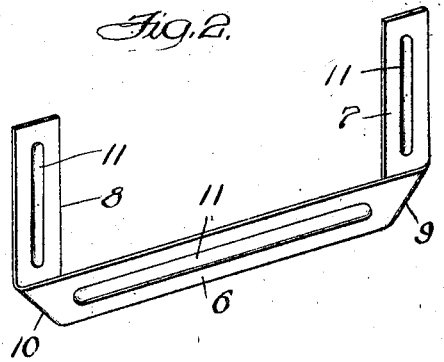
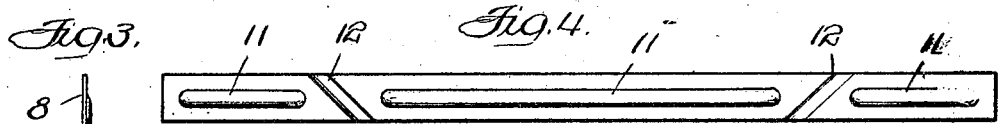
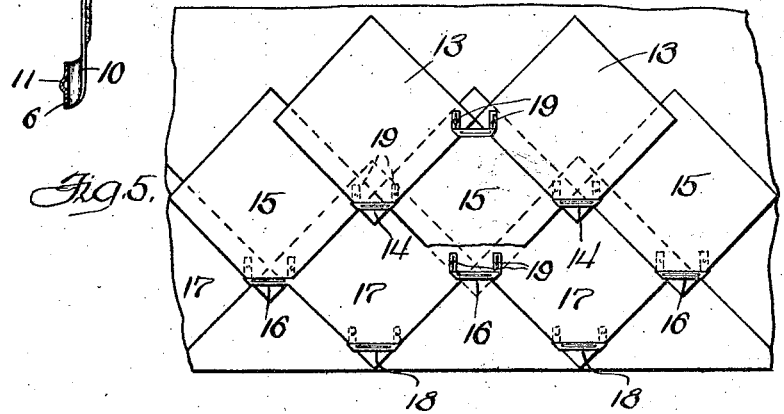
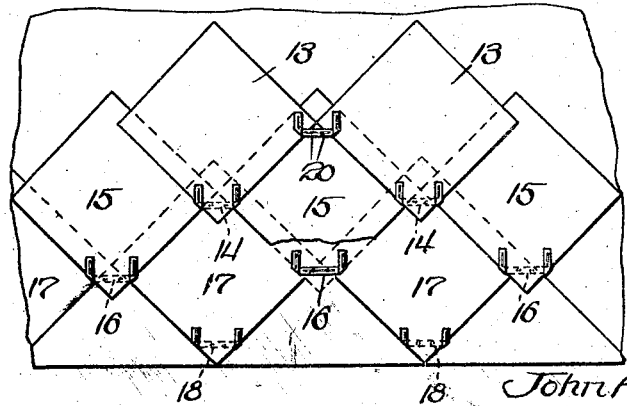
Inventor:
John A. Topping Patented June 10, 1924.

1,496,912

UNITED STATES PATENT OFFICE.

JOHN A. TOPPING, OF CHICAGO, ILLINOIS.

SHINGLE CLAMP.

Application filed July 29, 1922. Serial No. 578,350.

*To all whom it may concern:*

Be it known that I, JOHN A. TOPPING, a citizen of the United States, residing at Chicago, in the county of Cook and State of Illinois, have invented certain new and useful Improvements in Shingle Clamps, of which the following is a specification.

This invention relates to shingle clamps.

It is an improvement upon the clamp disclosed in my co-pending application Serial No. 453,434, filed March 18, 1921.

One of the objects of this invention is to provide an improved method of securing shingles in place.

Another object is to provide an improved clamp for anchoring the base of butt ends of shingles without bending or perforating the same.

Another object is to provide a clamp which will allow the shingles to lie flat.

Another object is to provide a clamp which will not materially elevate any part of the shingles of one course from those of a preceding course or from the roof.

Another object is to provide a clamp having a socket for receiving and anchoring the butt end of a shingle.

Another object is to provide a clamp which may more accurately fit a shingle.

Another object is to provide a clamp which will assist in the proper laying of shingles.

Another object is to provide a clamp especially adapted for use with shingles made from relatively soft and flexible material.

Another object is to provide a clamp which will hold shingles securely in place.

Another object is to provide a clamp which is simple, reliable, inexpensive and easy to apply.

Other objects and advantages will hereinafter appear.

Embodiments of the invention and its application are illustrated in the accompanying drawing, wherein—

Fig. 1 is a perspective of a clamp from one side.

Fig. 2 is a perspective of a clamp from the reverse side.

Fig. 3 is a section on the line 3—3 of Fig. 1.

Fig. 4 shows one type of blank from which a clamp may be formed.

Fig. 5 is a plan of a section of shingles showing one way of using the improved clamp, and Fig. 6 is a similar view of a section of shingles showing a different way of using the clamp.

Figs. 1 to 3 show the construction of the preferred form of clamp. The clamp may be made in one piece from a relatively thin and narrow strip of suitable sheet metal such as copper, galvanized iron or zinc. The strip is folded upon itself at the required distance from each end so as to form an interconnecting body or yoke 6 and a pair of legs 7 and 8 extending at an angle therefrom. The legs and yoke may form a substantially U shaped structure. The legs are not folded tightly against the body or yoke but are left spaced away therefrom and substantially parallel to the plane thereof. The metal forming the folds in the strip therefor provide a pair of converging abutments or seats 9 and 10 and with the legs and yoke form a pair of stirrups or sockets for receiving the edges of a shingle. If desired, holes may be provided in the yoke or legs for receiving nails or other fastening means for anchoring the clamp in place, as will be hereinafter described.

The legs and yoke may be strengthened and made more rigid by stamping small beads 11 therein, if desired.

Fig. 4 shows a flat blank which may be bent to form a clamp. Converging grooves or beads 12 serve to facilitate the proper folding of the metal strip, either at the factory or at the location of use, to provide the desired converging seats and pockets between the legs and yoke.

Figs. 5 and 6 each show a part of three courses of shingles. The butt of shingles 13 of the top or third course are held by clamps 14; those of shingles 15 of the second course by clamps 16, and those of shingles 17 of the first course by clamps 18. The clamps may be all alike and the fastening means for the clamps of one course of shingles assist in holding in place the shingles of the preceding course.

According to Fig. 5 the clamp is applied with the yoke exposed and the legs covered by the shingles of a succeeding course. Its legs are secured by suitable means such as nails 19, at proper intervals, to the roof or wall or through the preceding shingles near adjacent corners. The legs lie flat against the roof, wall or underlying course of shingles. The yoke bridges the angle between the converging sides of adjacent shingles and lies above the same. After the desired number of clamps have been secured in place the next course of shingles is applied. The butts of these shingles are inserted under the bodies or yokes of the clamps and pushed down until their edges are firmly seated in the sockets against the converging abutments or seats. The yokes may then be given a slight blow with a hammer near or over each leg, closing the walls of the sockets upon the shingles and firmly holding the same in place. The same procedure is repeated for each course of shingles until the roof or wall is covered.

According to Fig. 6 the clamp is applied with the legs exposed and the yoke covered by the shingles of a succeeding course. The yoke is, in this case, nailed to the roof or wall or through the preceding course of shingles by nails 20 and lies flat thereagainst. The legs consequently lie above the plane of the yoke and the butt ends of shingles of the succeeding course are slipped thereunder and the converging edges are seated in the sockets against the converging seats. The legs may then be given a slight blow with a hammer and firmly pressed against the shingles, closing the sockets to clamp the edges of the shingles therein.

The clamp, being made by simply bending thin strip metal, is inexpensive to produce. The legs and yoke being thin and lying flat do not materially raise any portion of the next succeeding course of shingles whether either method of application is used. The quite extensive surface of the converging seats and their substantial conformity to the edges of the shingles gives good support for the shingles, serves as a ready means for properly positioning the shingles and permits the use of relatively soft, flexible and relatively inexpensive prepared shingle material without danger of injury thereto. Shingles of relatively soft and flexible material may be held flat on a roof or wall against the action of the wind, etc., especially after the sockets are closed upon them.

Having described my invention what I claim as new and desire to secure by Letters Patent, is:—

1. A shingle clamp made from a single piece of metal bent to form a yoke and two legs of equal length projecting at an angle therefrom, the fold between the legs and yoke forming pockets for the edges of a shingle.

2. A shingle clamp comprising a relatively thin narrow strip having its terminal ends substantially parallel and folded at an angle from the body part and occupying planes spaced away from the body part to receive a shingle between the body part and said terminal ends.

3. A shingle clamp, to hold shingles on a roof, comprising a single piece of metal having a yoke member and two leg members, the legs laterally displaced from the yoke forming seats between the members for receiving the butt end of a shingle.

4. A clamp for shingles comprising a strip providing a yoke with its terminals folded at angles of forty-five degrees to form pockets, said strip creased at the point of fold to facilitate folding.

5. A clamp to hold shingles on a roof comprising a flat, narrow, elongated, metal strip folded near its ends to provide shingle-receiving pockets between the respective ends and the body part of the strip.

In testimony whereof I hereunto subscribe my name.

JOHN A. TOPPING.